United States Patent

Lorenz et al.

[11] 4,077,880
[45] Mar. 7, 1978

[54] FILTRATION OF A LIQUID

[75] Inventors: Jürgen Lorenz; Frank Mehdorn, both of Berlin, Germany

[73] Assignee: Spinnstoffabrik Zehlendorf Aktiengesellschaft, Berlin, Germany

[21] Appl. No.: 507,976

[22] Filed: Sep. 20, 1974

[30] Foreign Application Priority Data

Jul. 19, 1974 Germany .............................. 2434828

[51] Int. Cl.² .............................................. B01D 37/00
[52] U.S. Cl. ....................................... 210/65; 425/199
[58] Field of Search ................. 210/65, 263, 266, 283, 210/290; 425/199

[56] References Cited

U.S. PATENT DOCUMENTS 2,883,261  4/1959  McGeorge ........................... 210/283

FOREIGN PATENT DOCUMENTS 1,314,284  4/1973  United Kingdom.

Primary Examiner—Charles N. Hart
Assistant Examiner—Ivars Cintins
Attorney, Agent, or Firm—Curtis, Morris & Safford

[57] ABSTRACT

A process for filtering a liquid through a combination of a first sieve, a sand pack and a second sieve in the direction of flow of the liquid, is described. This process differs from the known process in that the liquid passes through a filter pack in which the mesh width of the first sieve is at most equal to the mesh width of the second sieve, and the mesh width of the second sieve is smaller than the smallest-particle size of the sand in the sand pack. Furthermore, the mesh width of the second sieve is at most 80 microns.

When using this process uniform filaments without variations in titer from filament to filament or over the length of a filament are obtained. The rise in pressure relating to time is very small.

4 Claims, 1 Drawing Figure

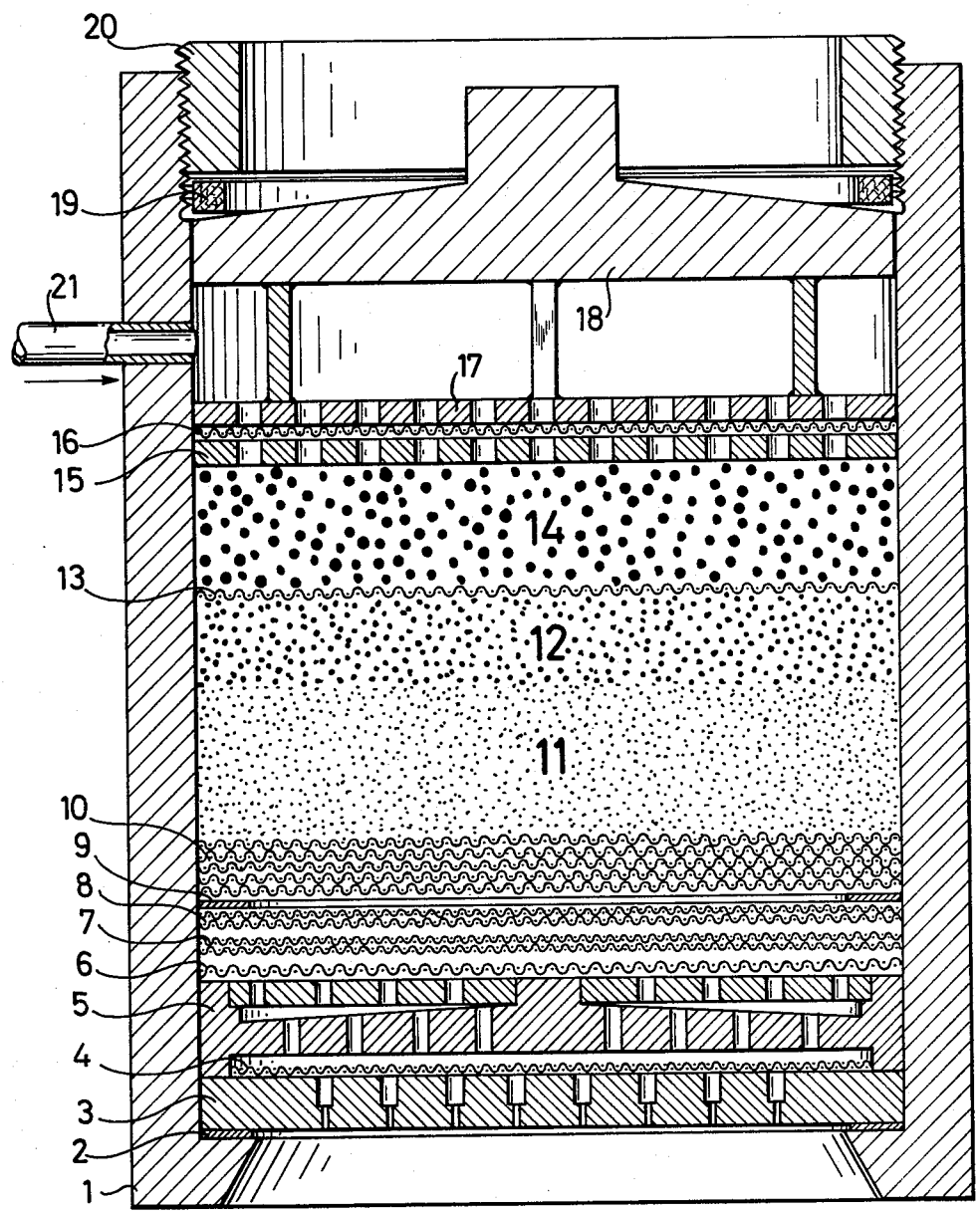

FILTRATION OF A LIQUID

The present invention relates to an improvement in the filtration of liquids through a combination consisting of a first sieve, a sand pack and a second sieve, disposed one after the other in the direction of flow of the liquid to be filtered.

In the spinning of filaments from synthetic polymers of high molecular weight a very effective filtration and a good mixing of the melt or the solution are of decisive importance. Impurities and heterogeneities in melts or solutions of high polymers trouble the spinning process and affect the quality of the spun products. Heterogeneities may result, for example, in considerable variations of titer. Above all when spinning very fine filaments, there often occur individual or even several filaments which are much thinner than the other filaments spun through the same spinneret. Such irregularities cannot be corrected in the further processing of the filaments.

Therefore, attempts have been made to retain impurities by suitable filters before the melt or solution passes the spinneret and to homogenize the melt or solution by strong shearing forces. This is done by combinations of varying numbers of sieves of different constructions and mesh sizes, as described, for example, in German Offenlegungsschrift No. 1,915,181. In the direction of flow of the melt or solution through the filter the retaining power of the filter elements diminishes.

For filtering and to assure shearing stresses there have also been proposed sand packs consisting of most different materials in different shapes and particles sizes. It is also known to arrange one above the other layers of filter materials of different particle sizes (cf. U.S. Pat. No. 2,266,368). The sand pack may also be capped with a coarse screen (cf. British Pat. No. 1,314,284).

Between the sand packs and the plate of the spinneret additional filter sieves have to be arranged in order to prevent sand particles from penetrating into the orifices of said plate.

The mesh size of the said sieves should be smaller than the smallest particles of the sand used. On the one hand, the particles size of the sand and the mesh size of the sieves are chosen as large as possible in order to maintain a low decrease of pressure in the filter and, on the other hand, they should be small enough to retain all impurity particles exceeding to maximum permissible dimensions. According to experience, the mesh widths are in the range of from about 15 to 80 microns, preferably 40 to 80 microns, depending on the desired quality of the spun filaments.

All the processes referred to above have the disadvantage that the filters have to be exchanged after a relatively short period of time where the increase of pressure in the sieve combination becomes too high or the filtering effect subsides.

It has been found that the particles of the sand pack or the material rubbed thereof gradually clog the following sieve so that the active filtering surface constantly diminishes and, hence, the pressure in the spinning head increases and the filtering effect decreases.

British Pat. No. 1,040,290 provides a filter combination for the filtration of melts of high molecular weight polymers, which combination is composed, in the direction of flow of the melt, of a sintered metal disk having a pore size of 125 microns, a first and a second sand pack, a screen having a pore width of about 420 microns and a sintered metal disk having a pore size of 125 microns.

In this combination the first and the second metal sinter plate have the same pore size, but, according to our investigations, a pore size of 125 microns is much too large to ensure an unobjectionable spinning of the polymer inasmuch as the spinning properties of the melt are the better the finer the sieves used are.

It is the object of the present invention to provide a process for filtering melts and solutions, preferably in the spinning head of melt spinning units for synthetic filaments, wherein the pressure in the filter increases distinctly slower than in the known processes and nevertheless spinning of the polymers without trouble is ensured.

According to the invention this object is achieved by choosing the mesh width of the first sieve at most equal to the mesh width of the second sieve and the mesh width of the second sieve is smaller than the smallest particle size of the sand pack, the mesh width of the second sieve being at most 80 microns.

The mesh width of the first sieve is preferably smaller than the mesh width of the second one. According to a preferred embodiment of the invention the mean particle size of the sand in the sand pack is from 5 to 50 and more preferably from 10 to 20 times greater than the mesh width of the first sieve.

The process of the invention can be used for all high molecular weight polymers capable of being spun from the melt or from a solution, such as, for example, polyesters, copolyesters, polyamides, copolyamides, polyester amides, polyolefins, polyvinyl chloride, polyacrylonitrile, polyvinyl alcohol, and the like. The process of the invention is preferably used to filter polyethylene terephthalate and the copolyesters thereof, poly-$\epsilon$-amino-caprolactam and poly-hexamethylene-adipic acid amide and the copolyamides thereof.

The sand pack used in conjunction with the invention consists of a finely divided material that is inert with respect to the spinning mass and does not melt at the filtering temperature. There are suitable a great number of inert materials; preferably silicon carbide, quartz sand, or corundum are used. If desired, the sand pack may be solidified by sintering.

The fineness of grain of the material used for the sand pack may vary within a wide range, particle sizes of from 24 to 72 according to ASTM Standards being preferred. However, larger or smaller ranges of particle sizes may also be used.

Suitable sieves to be used according to the invention are, for example, arrangements comprising one or several metal mesh sieves or screens having approximately 50 to 40,000 meshes per square centimeter. Other suitable sieves are porous sintered masses, structures of high melting fiber material and the like and especially sintered porous metals or metal fleeces (of chromium, manganese, iron, stainless steel). It is quite evident that the sieve must not melt or decompose at the respective spinning temperature.

It has surprisingly been found that in spinning the process of the invention yields uniform filaments without variations in titer from filament to filament or over the length of a filament. As compared to known processes, the rise in pressure relating to time was much shorter; in many experiments the lifetime of the filter was over twice as long as that of a known filter before the pressure in the filter reached the admissible limit.

It can be assumed that the melt or solution, when entering the filter combination, is substantially filtered in the first sieve. It proves advantageous that this first sieve is not clogged by particles of the sand pack but the entire surface thereof is available for the filtration of the arriving melt or solution. In the sand pack the melt or solution is subjected to a high shearing stress and thus homogenized and also further filtered. The shearing stress can be adapted to the type of melt to be filtered by an appropriate selection of the sand pack, for example by the particles size, the shape of the particles, or the local distribution of the particle sizes in the sand pack.

After having passed the sand pack, the melt or solution is pressed through the second sieve in which it is filtered again and freed from particles of the sand pack and abraded fractions thereof.

The process of the invention is preferably used for the filtration of melts or solutions in the spinning head, i.e. directly prior to spinning of the synthetic filaments. Alternatively, it can also be used for the filtration in melt conduits and it is not limited, of course, to melt spinning of synthetic filaments. It is likewise suitable for any other processing of melts, for example in injection molding, the extrusion of ribbons or pipes and for filtering spinning solutions.

The following examples illustrate the invention.

In Examples 1 to 3 polyethylene glycol terephthalate having a specific viscosity of 0.75, measured in a 1% by weight solution of the polymer in a solvent mixture consisting of phenol and tetrachloroethane in a proportion by weight of 3 : 2, was spun at a spinning temperature of 280° C through a spinneret having 250 orifices each having a bore diameter of 0.5 mm, at a rate of 360 grams per minute.

EXAMPLE 1: (Comparative Example)

In this example a conventional spinning pack on the model of the filter bed described in British Pat. No. 1,314,284 as shown in the accompanying drawing was used.

Referring to the drawing:

The spinning pack included a filter body 1, an aluminum packing 2, the spinneret 3, a fine screen 4 having 10,000 meshes per square centimeter to filter out particles of a size down to 60 microns, a bridge plate with inset 5, a coarse screen 6 having 64 meshes per square centimeter to filter out particles having a diameter of over 750 microns, a combination of two fine screens 7 each having 10,000 meshes per square centimeter like screen 3 and filtering out particles with diameters greater than 60 microns, a screen combination 8 consisting of a lower screen having 370 meshes per square centimeter corresponding to a retaining power for particles of from 300 microns and an upper screen having 5,900 meshes per square centimeter corresponding to a retaining power for particles of from 80 microns, a further aluminum packing 9, a screen combination 10 composed of five coarse screens each having 64 meshes per square centimeter and retaining particles of 750 microns upward, a layer 11, 1.25 cm thick, of fine sand of a particle size of from 0.4 to 0.5 mm retaining particles of a diameter of 60 microns upward, another layer 12, 0.7 cm thick, of sand of a mean particle size of from 0.7 to 1 mm retaining particles of a diameter of from 110 microns, a coarse screen 13 having the same mesh number as screen 6, a 1 cm thick layer 14 of coarse sand having a particle size of 1.2 to 1.5 mm filtering out particles greater than 190 microns, a distributor plate 15, a screen 16 having a mesh aperture of 750 microns, a further distributor plate 17, a pressure hood 18, a sealing for the pack 19, a locking ring 20 and the inlet 21 for the polymer to be filtered and spun.

The initial pressure in the filter pack amounted to 250 atmospheres. The load limit of the spinning pack of 300 atmospheres was reached after a time of operation of 5½ days. After said period of time the spinning pack had to be exchanged bacause of the higher pressure required.

EXAMPLE 2

Under the conditions specified in Example 1 the same polymer was pressed through the spinning pack in which the coarse screen 16 had been replaced by a combination of fine screens having a retaining power for particles above 80 microns composed in the same manner as screen combination 8 referred to in Example 1 (lower screen with 370 meshes per $cm^2$ retaining particles above 300 microns and upper screen with 5,900 meshes per $cm^2$ retaining particles above 80 microns).

This spinning pack in accordance with the invention had a lifetime of 20½ days until the pressure limit of 300 atmospheres had been reached. The measured initial pressure was about 200 atmospheres. It can be seen that the combination of fine screens 16 was exceedingly important, the lifetime of the pack was almost quadrupled as compared to Example 1 in which a coarse screen 16 had been used.

EXAMPLE 3

The polymer was filtered through the spinning pack described in Example 2 under the conditions of Example 1, with the exception, however, that the layers of medium sand 12 and fine sand 11 were replaced by coarse sand having a particle diameter of from 1.2 to 1.5 mm. With this spinning pack the required initial pressure of about 60 atmospheres was much lower than the pressure in the spinning pack of Example 2.

The required pressure remained constant over a period of 22 days and then rose but slightly during the course of the following 7 days. The grade of filtration of this filter pack was equal to that of the pack used in Examples 1 and 2. It can be seen that in accordance with the process of the invention coarser sand can be used for filtering the polymer melt.

However, the shearing forces within the pack are lower owing to the smaller fall in pressure and, therefore, mixing and homogenizing of the melt in the spinning pack is less effective. Consequently, care has to be taken that the particle size of the sand is only so large that the desired uniformity of the spun filaments is still obtained.

What is claimed is:

1. In the process for filtering a polymer liquid through a filter pack consisting essentially of the combination of a first sieve, an intermediate sand pack and a second sieve in the direction of flow of the liquid, the improvement which comprises passing the polymer liquid through the filter pack by initially passing the liquid through said first sieve upon entering the filter pack, then through said sand pack and thence through said second sieve, while providing that the mesh of the first sieve is at most equal to the mesh width of the second sieve and the mesh width of the second sieve is smaller than the smallest particle size of sand pack, the mesh width of the second sieve being at most 80 microns.

2. The process as claimed in claim 1, wherein the mesh width of the first sieve is smaller than that of the second sieve.

3. The process as claimed in claim 1, wherein the mean particle size of the sand pack is 5 to 50 times larger than the mesh width of the first sieve.

4. The process as claimed in claim 3, wherein the particle size of the sand pack is 10 to 20 times larger than the mesh width of the first sieve.

* * * * *